United States Patent
Ting, Jr. et al.

(10) Patent No.: US 10,147,263 B1
(45) Date of Patent: Dec. 4, 2018

(54) SKILL-BASED WAGERING GAMING SYSTEMS AND METHODS

(71) Applicant: Gamiker Inc., Pasadena, CA (US)

(72) Inventors: Raymond Ting, Jr., San Marino, CA (US); Robert Rittenhouse Meaders, Pasadena, CA (US); Andrew Richard Nay, Pasadena, CA (US); Mark C Nicely, Daly City, CA (US)

(73) Assignee: GAMIKER INC., Pasadena, CA (US)

(*) Notice: Subject to any disclaimer, the term of this patent is extended or adjusted under 35 U.S.C. 154(b) by 0 days.

(21) Appl. No.: 15/146,887

(22) Filed: May 4, 2016

Related U.S. Application Data

(63) Continuation of application No. 15/099,589, filed on Apr. 14, 2016, now abandoned.

(60) Provisional application No. 62/147,436, filed on Apr. 14, 2015, provisional application No. 62/152,725, filed on Apr. 24, 2015, provisional application No. 62/156,808, filed on May 4, 2015, provisional application No. 62/280,623, filed on Jan. 19, 2016.

(51) Int. Cl.
*G07F 17/32* (2006.01)
*A63F 13/46* (2014.01)

(52) U.S. Cl.
CPC .......... *G07F 17/3213* (2013.01); *A63F 13/46* (2014.09); *G07F 17/3269* (2013.01); *G07F 17/3295* (2013.01); *G07F 17/3265* (2013.01); *G07F 17/3267* (2013.01)

(58) Field of Classification Search
CPC ............. G07F 17/3213; G07F 17/3265; G07F 17/3267; A63F 13/46
See application file for complete search history.

(56) References Cited

U.S. PATENT DOCUMENTS

| | | | | |
|---|---|---|---|---|
| 6,910,962 B2 * | 6/2005 | Marks | ...................... | G07F 17/32 463/16 |
| 7,144,322 B2 * | 12/2006 | Gomez | ................... | G07F 17/32 463/16 |
| 7,357,713 B2 * | 4/2008 | Marks | ...................... | G07F 17/32 463/15 |
| 7,749,082 B2 * | 7/2010 | Dunaevsky | ......... | G07F 17/3211 463/1 |
| 7,771,264 B2 * | 8/2010 | Kane | ................... | G06Q 20/3433 273/138.1 |
| 8,083,581 B2 * | 12/2011 | Marks | ...................... | G07F 17/32 463/20 |
| 8,105,151 B2 * | 1/2012 | Caputo | ............... | G07F 17/3265 463/21 |
| 8,323,091 B2 * | 12/2012 | Frank | ................... | G07F 17/3244 463/16 |
| 8,444,473 B2 * | 5/2013 | Ching | ................. | G07F 17/3267 463/16 |
| 8,662,986 B2 * | 3/2014 | Rodgers | .............. | G07F 17/3262 463/20 |
| 8,727,867 B2 * | 5/2014 | Kane | ....................... | A63F 13/12 463/15 |
| 8,790,169 B2 * | 7/2014 | Saunders | ................ | G07F 17/32 463/2 |

(Continued)

*Primary Examiner* — William H McCulloch, Jr.
(74) *Attorney, Agent, or Firm* — Newman Law, LLC

(57) ABSTRACT

Systems and methods of conducting games involving, among other things, providing, hosting, conducting and/or facilitating modified wagering games which have outcomes dependent at least in part on twitch-skill and/or strategic use of time during the game.

7 Claims, 10 Drawing Sheets

(56) References Cited

U.S. PATENT DOCUMENTS

| | | | | |
|---|---|---|---|---|
| 9,202,339 B2* | 12/2015 | Ching | ................. | G07F 17/3267 |
| 9,262,895 B2* | 2/2016 | Rodgers | .............. | G07F 17/3262 |
| 9,299,224 B2* | 3/2016 | Leupp | .................... | G07F 17/34 |
| 9,355,528 B2* | 5/2016 | Nicely | .................... | G07F 17/34 |
| 9,472,065 B2* | 10/2016 | Nicely | .................... | G07F 17/34 |
| 9,542,799 B2* | 1/2017 | Washington | ........ | G07F 17/3227 |
| 9,542,808 B2* | 1/2017 | Marks | ..................... | G07F 17/32 |
| 9,561,437 B2* | 2/2017 | Knutsson | ................. | A63F 13/12 |
| 9,600,978 B2* | 3/2017 | Acres | ........................ | A63F 9/24 |
| 9,886,817 B2* | 2/2018 | Acres | ........................ | A63F 9/24 |
| 2003/0157981 A1* | 8/2003 | Marks | ..................... | G07F 17/32 |
| | | | | 463/20 |
| 2004/0033829 A1* | 2/2004 | Pacey | ................. | G07F 17/3265 |
| | | | | 463/20 |
| 2004/0043809 A1* | 3/2004 | Gomez | .................. | G07F 17/32 |
| | | | | 463/16 |
| 2005/0148381 A1* | 7/2005 | Marks | ..................... | G07F 17/32 |
| | | | | 463/16 |
| 2008/0090655 A1* | 4/2008 | Marks | ..................... | G07F 17/32 |
| | | | | 463/29 |
| 2008/0102931 A1* | 5/2008 | Marks | ..................... | G07F 17/32 |
| | | | | 463/20 |
| 2015/0194020 A1* | 7/2015 | Lamendola | ......... | G07F 17/3286 |
| | | | | 463/19 |
| 2015/0310702 A1* | 10/2015 | Arnone | ................. | G07F 17/326 |
| | | | | 463/25 |
| 2017/0116816 A1* | 4/2017 | Marks | ................. | G07F 17/3211 |
| 2017/0116821 A1* | 4/2017 | Marks | ................. | G07F 17/3244 |
| 2017/0124812 A1* | 5/2017 | Washington | ........ | G07F 17/3295 |
| 2017/0193752 A1* | 7/2017 | Arnone | ............... | G07F 17/3262 |

* cited by examiner

FIG. 2a
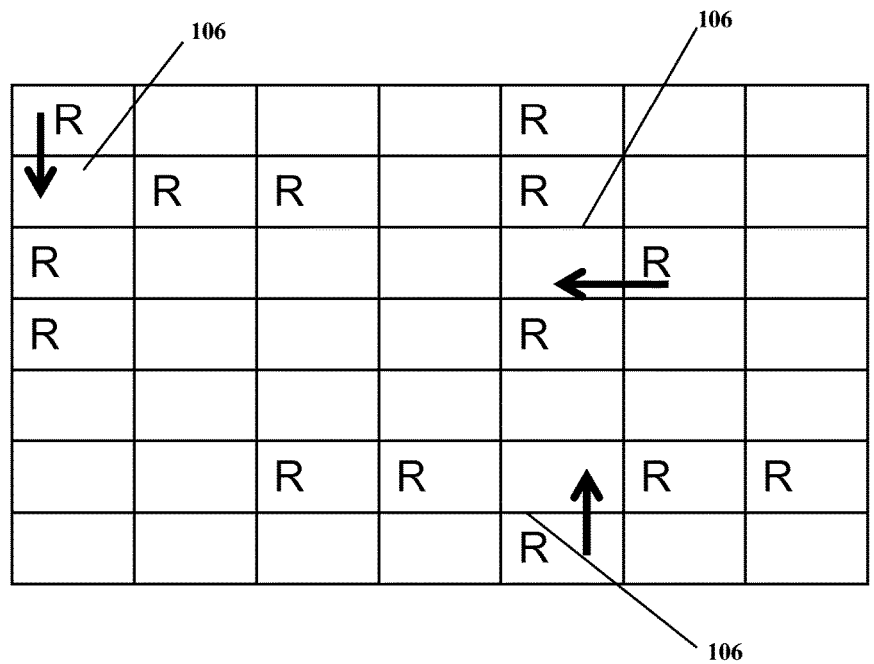
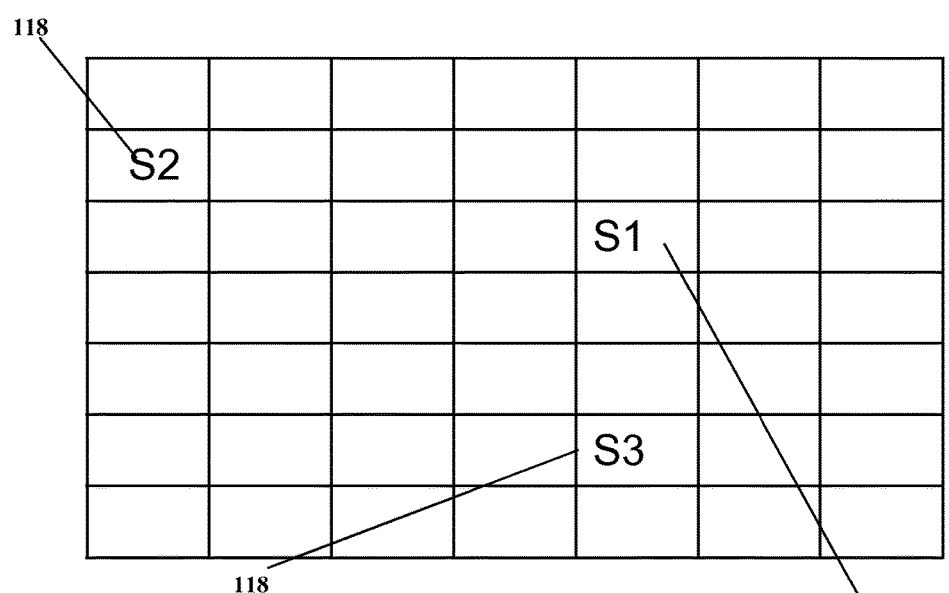
FIG. 2b

| R | B | G | P | R | W | P |
|---|---|---|---|---|---|---|
| P | R | R | P | W | B | R |
| P | W | B | G | R | W | R |
| B | B | *S1* | P | P | G | G |
| P | G | B | G | W | P | B |
| B | R | G | R | W | B | R |
| P | W | R | W | B | G | W |

SKILL-BASED WAGERING GAMING SYSTEMS AND METHODS

BACKGROUND OF THE INVENTION

Field of the Invention

The invention generally relates to systems and methods of providing, hosting, conducting and/or facilitating modified wagering games which have outcomes dependent at least in part on twitch-skill and/or strategic use of time during the game.

Description of the Related Art

Many games have been developed over the years and some are particularly adapted for wagering. Some game players do not like wagering games because they are perceived as having outcomes which are too highly based on chance only. Many game players have grown used to playing electronic games that have a variety of interactive features and require a measure of skill and use of strategy. Some of these types of games are hugely popular and have many millions of players. These games offer a player the opportunity to get better and achieve greater results in the game as they develop skills and hone strategies during continued game play, which rewards players with an overall richer and more complex gaming experience.

There is a need to provide additional wagering games that offer players similar opportunities and rewarding experiences. Wagering game operators, both physical and virtual, wish to attract players to their establishments or websites. Accordingly, there is continual interest and need for such wagering games.

SUMMARY OF THE INVENTION

The invention is generally directed to a method of providing a wagering game through executable instructions which upon execution by a processing device provide for hosting, conducting and/or facilitating modified wagering games which have outcomes dependent at least in part on twitch-skill and/or strategic use of time during the game.

Some embodiments of the invention are directed to a method of providing a skill-based wagering game, including programming and a plurality of executable instruction stored in a memory device, comprising the steps of: actuating a random number generator to randomly generate a grid of variable tiles in a first configuration for display on a user interface; moving a tile in the grid of variable tiles responsive to receiving tile movement data through the user interface and comparing the tile movement data with one or more preset criteria for permitting tile movement; and responsive to tile movement data being satisfying a wagering event preset criteria of the plurality of preset criteria, displaying the grid of variable tiles in a second configuration on the user interface and actuating a wagering event, wherein the wagering event involves at least one of a randomly generated outcome and a skill-based outcome, the randomly generated outcome being determined by the random number generator and the outcome thereof being displayed through the user interface and the skill-based outcome being determined by the preset criteria satisfied from the subsequently received tile movement data.

The variable tiles of the aforementioned method may include a plurality of groups of tiles.

In some embodiments, the wagering event preset criteria comprises a tile from a specific first group being moved adjacent to one or more tiles from a specific second group, the second group being different from the first group. In other embodiments, the wagering event preset criteria comprises a tile from a specific first group being moved adjacent to one or more tiles from the same group. The outcome determined by the random number generator is displayed by animating the grid such that the columns of the grid resemble spinning slot machine reels.

Some embodiments of the invention are directed to a method of directing a processor to execute game software, comprising: simultaneously operating and displaying through a single video playfield interface comprising a grid of variable tiles, a matching three or more tiles game and a slot machine game; and enabling a player to direct the processor to display spinning tiles through portions of the grid as determined by player success in the matching three or more tiles game; wherein, spinning tiles through portions of the grid stop in a stopped configuration and provide the player variable win/loss results as to a currency wager made on the spinning tiles through portions of the grid.

Some embodiments of the invention are directed to a method of administering a wagering game over a communication network, comprising the steps of: providing a game server and a user interaction server; providing, by the user interaction server, a client for execution on a user device connected to the network and associated with a player, the user device being remote from the game server; the client receiving from the user device and communicating to the game server, an indication of a wager being entered by the player to participate in the wagering game; the game server determining a first set of tiles in a grid formation defining an initial configuration of the grid; the game server communicating to the user interaction server the initial configuration; the user interaction server communicating to the user device the initial configuration for display on the user device; the game server receiving from the client a request for a change of the initial configuration from the user device; the game server comparing the request with a wagering event preset criteria for changing the initial configuration; the game server communicating to the user interaction server the actuation of a wagering event responsive to the request satisfying the wagering event preset criteria; the user interaction server communicating to the user device the actuation of a wagering event for display on the user device; and the game server resolving the wagering event by one or both of a randomly generated outcome and a skill-based outcome, the randomly generated outcome being determined by the random number generator and the outcome thereof being displayed through the user interface and the skill-based outcome being determined by the preset criteria satisfied from the subsequently received tile movement data.

Some embodiments of the invention are directed to a method of directing a processor to execute game software, comprising the steps of: displaying by a user device a graphical user interface (GUI) comprising at least a playfield grid of variable tiles; enabling a player to shuffle the variable tiles in order to generate matches of three or more tiles having the same variable; displaying on the playfield grid a wager tile; enabling the player to generate a match using the wager tile which initiates a wager event; conducting the wager event wherein the player wagers a predetermined amount of currency on a variable result with both win and lose conditions; and resolving the variable result of the wager event is where the player loses all or some of the wagered currency if the variable result is one of the lose conditions and where the player receives some multiple of the wagered currency is the variable result is one of the win conditions.

BRIEF DESCRIPTION OF THE DRAWINGS

While the disclosure concludes with claims particularly pointing out and distinctly claiming specific embodiments, various features and advantages of embodiments within the scope of this disclosure may be more readily ascertained from the following description when read in conjunction with the accompanying drawings, in which:

FIGS. 2a, 2b and 2c illustrate matches of special tiles according to embodiments of the invention;

DETAILED DESCRIPTION OF SOME EMBODIMENTS OF THE INVENTION

It should be understood that the methods and steps recited herein may be partially or wholly carried out in a variety of ways, such as by a dealer physically using game elements in a casino, via an electronic gaming machine (EGM) in a gaming establishment, through a computer or portable device, such as a mobile phone, capable of communicating via the Internet, global telecommunication network or world wide web. It should further be understood that the methods and systems of the invention are described herein are for illustrative purposes only, as the methods and systems of the invention are not limited to the embodiments herein.

For the purposes of this description, it will be understood that when an action related to the games disclosed herein is described herein, it may involve transmission and reception of data the results of the action may be computer generated and may be displayed on an electronic display, and, if applicable, the reception or detection of such an action in an electronic form where choices, selections, or other actions are received at an electronic interface.

Various platforms are contemplated that are suitable for implementation of embodiments of wagering games according to this disclosure. For example, embodiments of wagering games may be implemented as electronic gaming machines, partially or fully automated table games, fully automated, network-administered games (e.g., closed or open loop) that either produce results utilizing a processor, downloadable software applications or games accessible online or through any other communication network. For purposes of the description of the games provided herein, each and all of the platforms are collectively referred to as the "platform." Exemplary embodiments of the platform are provided herein below.

Games configured according to the invention and offered for play on the platform are generally multilayered in that they are configured for being played both for entertainment and as a wagering game for points, credit and/or money, whether real money or play for fun (virtual currency), even if the wagering game aspects are largely occurring in the background during game play.

Figure 1:
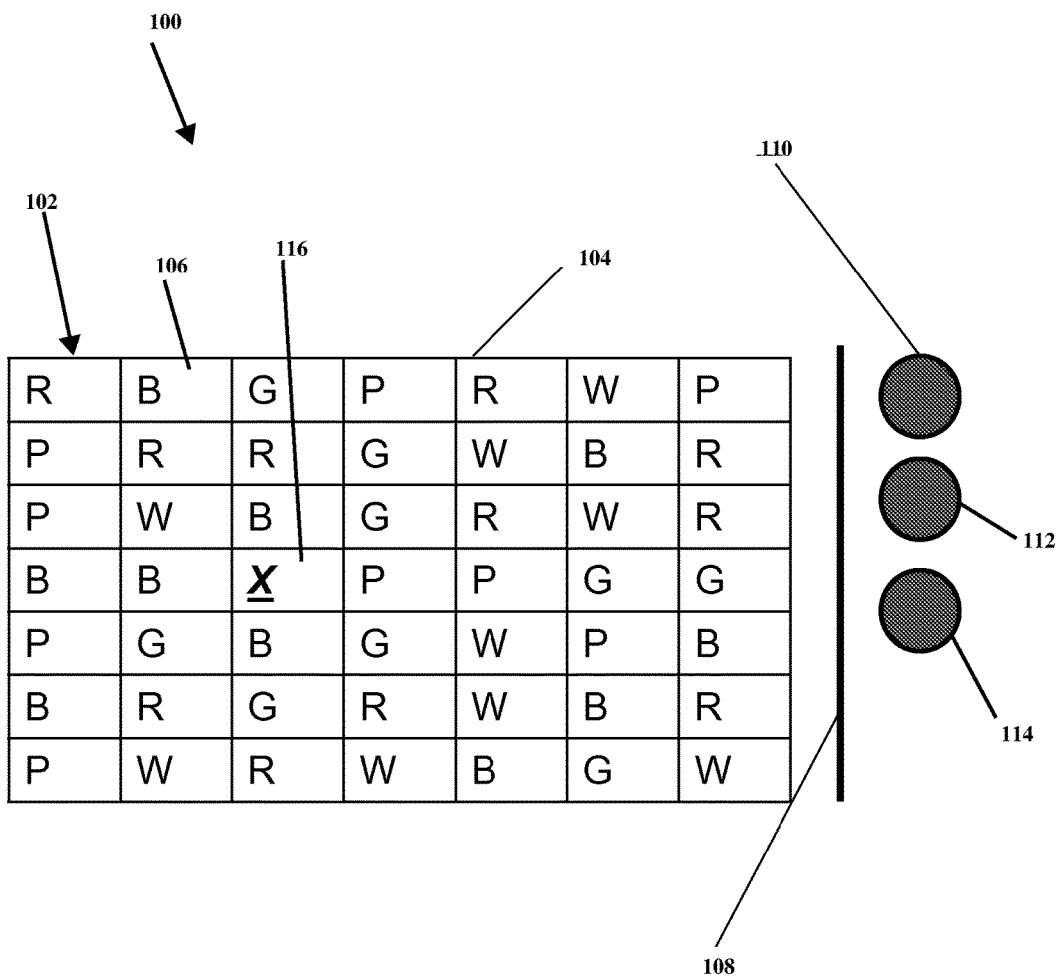
FIG. 1 is an illustrative example of a graphical user interface of the invention.

FIG. 1 is an illustrative example of a game user interface 100 configured according to the invention for display on a display device operatively associated with the platform. In this embodiment, the game 102 displayed to players comprises variation of a matching game, such as a "match 3" type game. A grid 104 composed of seven rows and seven columns of tiles 106. Each tile 106 has one or more items or values associated therewith. Each tile in a game may include values from the same categorical group, such as color, shapes, alphanumerical characters or symbols. In this embodiment, the values are represented by the letters R, B, G, P and W. Grid 104 may be randomly populated with tiles 106 via a processor accessing a random number generator. To play game 102 a player may be required to submit credits or money through any conventional means, such as an e-wallet or other payment transfer system if playing through an online platform, or a card or money reader if playing through an electronic gaming machine platform.

Game play of game 102 may involve matching a minimum of three tiles 106 having the same value either vertically or horizontally within grid 104. A match can be made to occur by moving tiles 106 within the grid so that three tiles having the same value are positioned to form a match, that is, three in a row either vertically or horizontally. Preferably, game 102 permits movement of a tile 106 one space horizontally or vertically at a time only if a match is formed as a result of the movement of a tile 106. Upon being matched, the matched tiles 106 are removed from grid 104 and the player may be awarded with credits or the probability of other events occurring during game play in which the player may win credits may be increased. The effect of a match may correspond with the number of tiles 106 removed or value of the tiles 106 matched. For example, the values of tile 106 may have a hierarchy or ranking, which may be based on the probability of a tile 106 of that value appearing, being generated or being matched during game play of game 102. For illustrative purposes, there may be less tiles 106 of a certain value made available in game 102 and thus matching such tiles 106 of this value is less likely but results in a greater credits.

Game 102 also involves a time condition by which additional credits may be earned. In this embodiment, players are given a preset amount of time to complete a round of game 102. A round can be completed upon achieving a preset goal, such as making all possible matches or a minimum number of matches. The round ends when the preset amount of time has expired. In some embodiments, the time may be extended by player actions or events in game 102, such as for example, by making a match or a certain number of matches or upon payment of credits. The time remaining may be represented on user interface 100 by a clock or a diminishing timer bar 108 as shown in this embodiment. In some embodiments, a sound associated with the decrease in remaining time may be played during game 102.

Game 102 includes game mechanic buttons 110, 112 and 114, which in this embodiment may be used to create enable different effects on game play of game 102, such as extending the time to play in a round, rearranging tiles 106 in grid 104 to create new opportunities for matches or to generate a special tile 106 having unique features, such as being "wild" (that is, able to be matched with any two other tiles 106 having matching values or being able to move differently than other tiles 106 within grid 104, such as two spaces or diagonally. It should be understood that accessing buttons 110, 112 or 114 may also result in the simultaneous deduction of a preset amount of the player's credits in game 102.

In some embodiments, new tiles 106 will appear upon the removal of matched tiles 106. A random number generator may be used to randomly generate the value of any new tiles 106 added to grid 104. In other embodiments, the removal of tiles 106 within grid 104 will result in tiles 106 above the removed tiles 106 being made to appear as if they are sliding downward relative to the position of grid 104 in interface 100, as if being impacted by gravity and the lack of tiles beneath to keep them in position. By moving downward, vacated cells in grid 104 may appear which are then replaced with new randomly generated tiles 106 moving downward into the vacated cell spaces of grid 104. In some embodiments, players may choose the number of values possible for new tile 106 generation. Players may receive credits as a result of matching existing tiles 106 and new tiles 106, or matching any combinations thereof, or the probability of other features occurring, such as wagering events may increase based on the number of matches.

Game 102 further includes a wager tile 116 represented by the letter X on FIG. 1. Use of wager tile 116 initiates a wagering game event. Generation and use of wager tile 116 may vary, and in some embodiments, wager tiles 116 are generated at a predetermined probability (such as for example, about 8%) upon the generation of new tiles 106. The probability may be adjusted depending on activity in game 102, such as the number of matches made, the number of tiles 106 matched at the same time (such as four or more), matching tiles 106 in both vertical and horizontal directions at the same time, the relative value of a match made if values are ranked, upon new tiles 106 being generated or rounds completed.

In some embodiments, wager tiles 116 may be used by selecting the wager tile 116, which in this embodiment results in the removal of wager tile 116 from grid 104. In other embodiments, wager tiles 116 have values or are wild and must be matched to be used in game 102. Wagering tiles 116 may appear as different and thus be identifiable as wagering tiles or may appear the same as any other tile 106 and only reveal themselves as a surprise during game play to trigger a wagering event such as a wagering event described herein.

Using a wager tile 116 may begin a wagering event in which players make a wager, which may involve selecting an amount of credits or automatically result in an amount of credits being placed at stake. The wager outcome may be determined based on actions in the game 102, such as the number of matches made after the wager tile 116 is used, or determined at random by a random number generator accessed by a process associated with the platform. If determined at random, animations or other features may be displayed to simulate the wager being determined, such as boxes for a player to selectively reveal, a slot reel display, or other display with either interactive or non-interactive features, such as the entire grid 104 spinning as if a seven by seven slot reel display, with the outcome having already been determined by the random number generator independently of the interactive appearance. Upon the completion of any animation credits are added or debited from the player's total credit amount based on the outcome determined by the random number generator.

FIGS. 2a and 2b illustrate examples of matches generating special tiles 118 of some embodiments of the invention. Special tiles may be generated by a qualifying event occurring during game play, such as greater than three tiles 106 being matched. In this embodiment there are three levels of special tiles, shown on grid 104 as S1, S2 and S3, respectively. These special tiles 218 are shown in the positions where tiles 106 were moved to create a match which qualified as a special tile generating event. The features of special tiles may vary, and may also be wagering tiles as discussed above. In some embodiments, special tiles 118 are purely for entertainment and provide different effects upon being accessed but do not change the player's total credits. In other embodiments, special tiles 118 may facilitate game play or otherwise provide the player with an advantage, such as a time extension or removal of extra unmatched tiles 106, without directly impacting the player's total credits. For illustrative purposes, the addition of time and the removal of additional tiles are both events which provide benefits to the player for the reasons discussed above. Special tiles may be identifiable as special tiles or appear as any other tile and thus reveal themselves as a surprise to players.

Figure 2C:
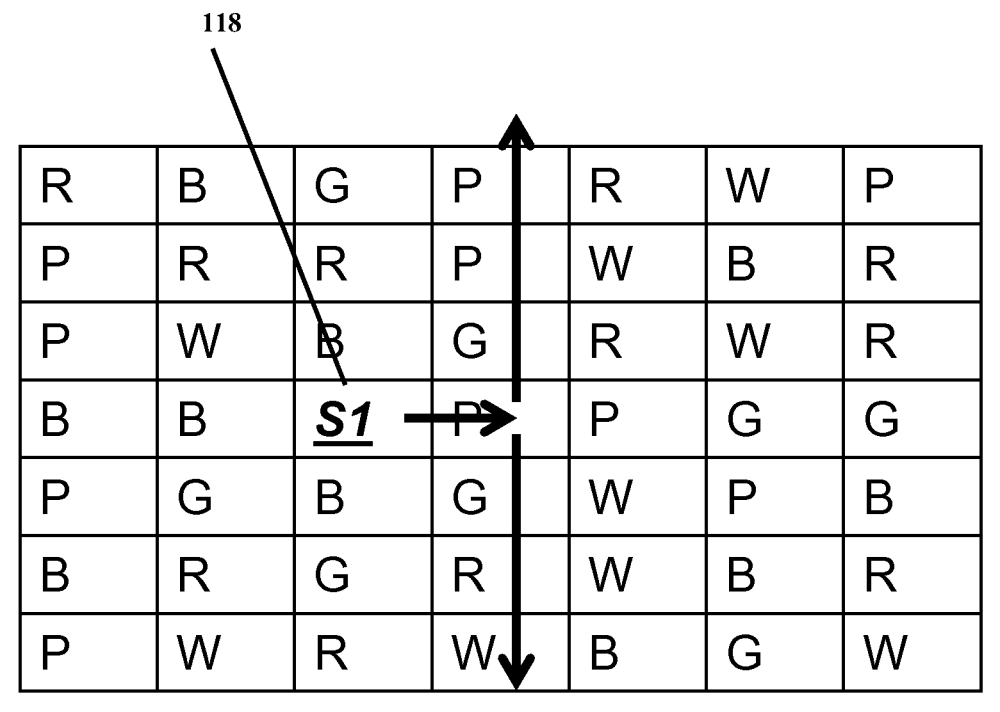

FIG. 2c illustrates an example of a special tile 118, having a G value, being moved to match with other G value tiles 106 positioned vertically. In this example, the use of the special tile 118 results in the removal of additional tiles, that is, all of the tiles in the same vertical column are removed. As discussed above, players may receive credits or wagering tiles may be more likely to appear based on the number of tiles 106 removed and/or removed simultaneously as a result of a match, thus benefitting the player.

Figure 3A:
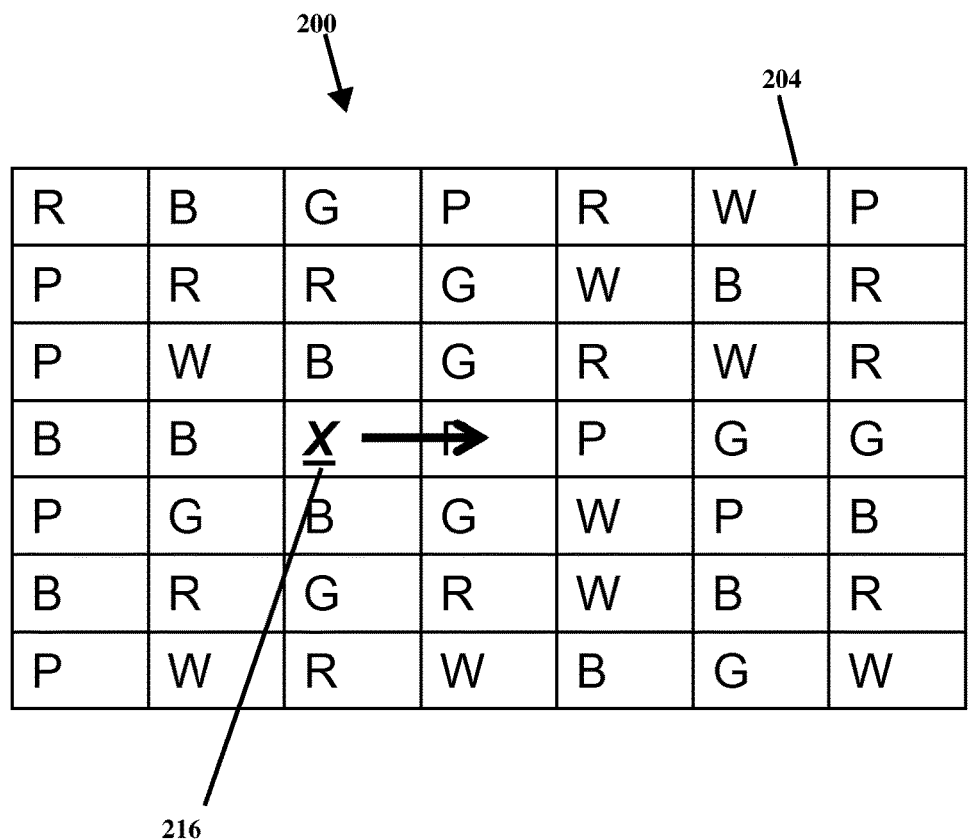
FIGS. 3a and 3b illustrates another embodiment of the invention.
Figure 3B:
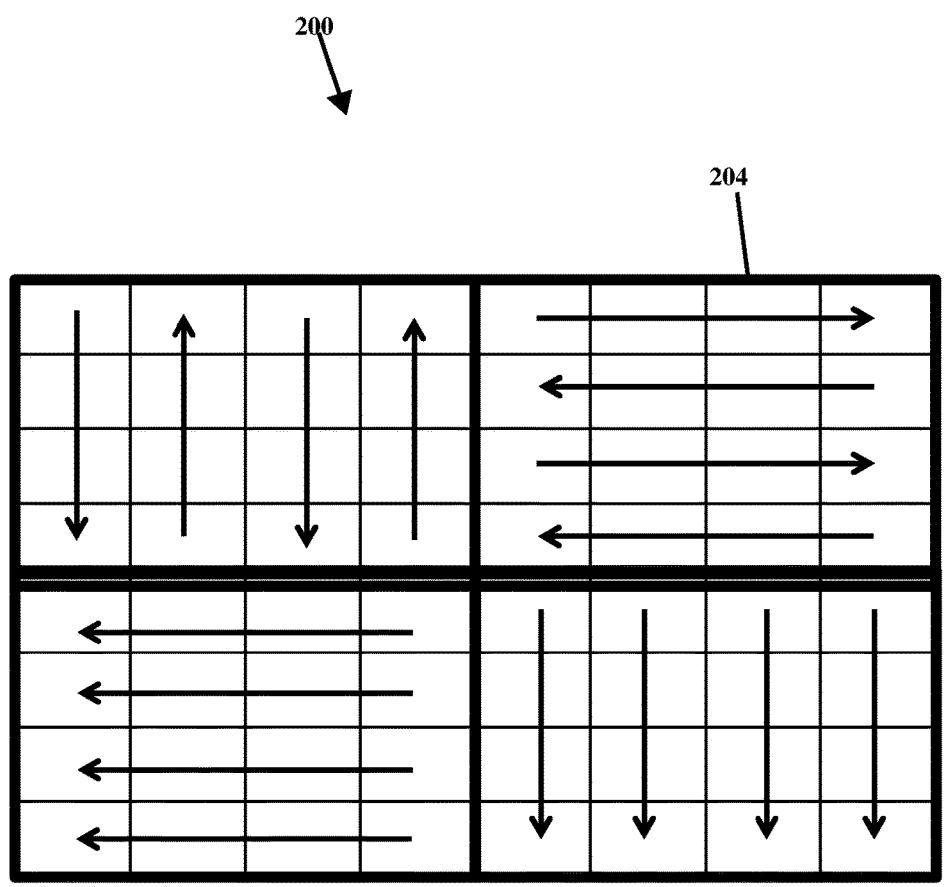

FIG. 3a and FIG. 3b illustrate an interface 200 with eight by eight grid 204. It should be readily apparent that a game of the invention should not be limited to any particular grid size or shape. In this embodiment, when a wager tile 216 is used in FIG. 3a, the eight by eight grid 204 is divided into four quadrants as shown in FIG. 3b, with each quadrant consisting of four reels which then spin as slot machines. A pay line may be selected by the location of the wager tile 216. Alternatively, the amount placed at stake, if the offered to the player, may determine the amount of paylines as in conventional slot play.

Figure 4:
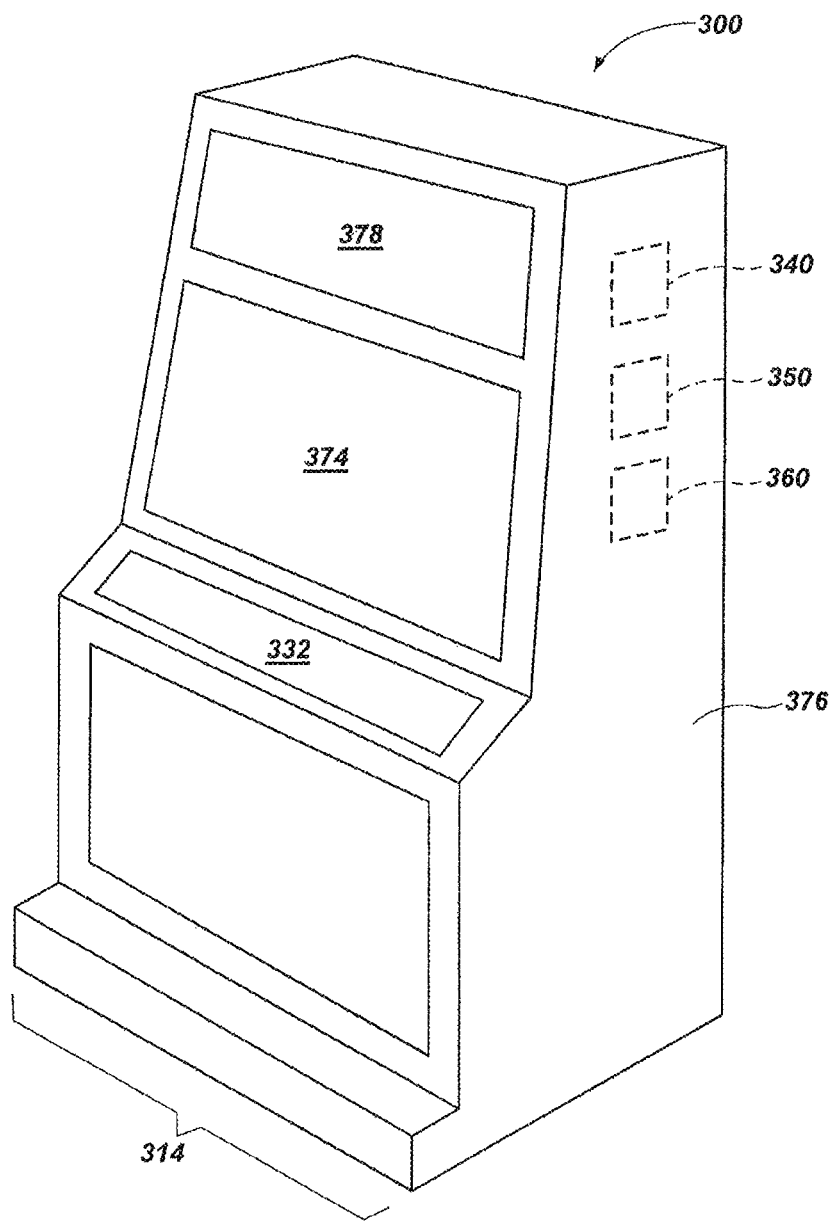
FIG. 4 is a perspective view of an individual electronic gaming device configured for implementation of embodiments of wagering games in accordance with this disclosure.

FIG. 4 is a perspective view of an individual electronic gaming device 300 (e.g., an electronic gaming machine (EGM)) configured for implementing wagering games according to this disclosure. The individual electronic gaming device 300 may include an individual player position 314 including a player input area 332 configured to enable a player to interact with the individual electronic gaming device 300 through various input devices (e.g., buttons, levers, touchscreens). The individual electronic gaming device 300 may include a gaming screen 374 configured to display indicia for interacting with the individual electronic gaming device 300, such as through processing one or more programs stored in memory 340 to implement the rules of game play at the individual electronic gaming device 300. Accordingly, game play may be accommodated without involving physical implements and live personnel. The action may instead be simulated by a control processor 350 operably coupled to the memory 340 and interacting with and controlling the individual electronic gaming device 300.

Although the individual electronic gaming device 300 displayed in FIG. 4 has an outline of a traditional gaming cabinet, the individual electronic gaming device 300 may be implemented in other ways, such as, for example, client software downloaded to a portable device, such as a smart phone, tablet, or laptop computer. The individual electronic gaming device 300 may also be a non-portable personal computer (e.g., a desktop or all-in-one computer) or other computing device. In some embodiments, client software is not downloaded but is native to the device or is otherwise delivered with the device when distributed.

A communication device 360 may be included and operably coupled to the processor 350 such that information related to operation of the individual electronic gaming device 300, information related to the game play, or combinations thereof may be communicated between the individual electronic gaming device 300 and other devices such as a server through a suitable communication medium, such as, for example, wired networks, Wi-Fi networks, and cellular communication networks.

The gaming screen 374 may be carried by a generally vertically extending cabinet 376 of the individual electronic gaming device 300. The individual electronic gaming device 300 may further include banners to communicate rules of game play and the like, such as along a top portion 378 of the cabinet 376 of the individual electronic gaming device 300. The individual electronic gaming device 300 may further include additional decorative lights (not shown), and speakers (not shown) for transmitting and optionally receiving sounds during game play.

Some embodiments may be implemented at locations including a plurality of player stations. Such player stations may include an electronic display screen for display of game information (e.g., tiles, grids, wagers, animations and game instructions) and for accepting wagers and facilitating credit balance adjustments. Such player stations may, optionally, be integrated in a table format, may be distributed throughout a casino or other gaming site, or may include both grouped and distributed player stations.

In some embodiments, the wagering games described herein may be played against a game administrator (i.e., against "the house" such that the game is "house-banked"). Such implementations may involve the game administrator (e.g., a casino or other gaming establishment) accepting (e.g., via a dealer or other agent of the administrator) wagers of real-world monetary value, distributing payouts of real-world monetary value on winning wagers to players, and collecting real-world monetary value of lost wagers.

In other embodiments, the wagering games, or at least one wager associated with the wagering games, may involve a player in a casino or other gaming establishment acting as banker, accepting wagers having real-world monetary value, issuing payouts having real-world monetary value, and collecting real-world monetary value of lost wagers (i.e., be "player-banked"). In some embodiments where at least one wager is player-banked, the game administrator may collect a player entrance fee, or a rake on each player-banked wager accepted from the participating players, including the banker.

In some embodiments, players may play a head to head or tournament version utilizing the gaming methods as described herein wherein players compete against one another or others. Players may begin with the same initial tiles in the same positions on a grid and then proceed with the winning player being the player having the most credits after a certain amount of game play or time has transpired.

Figure 5:
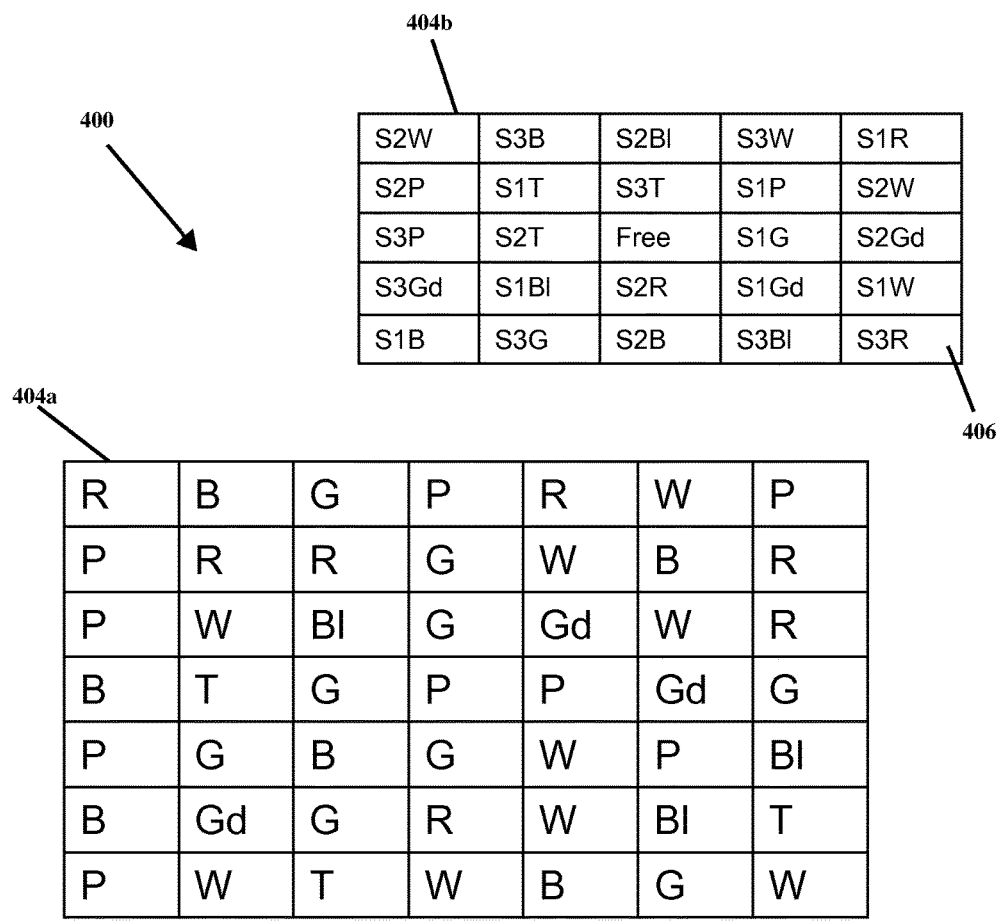
FIG. 5 illustrates a user interface for another embodiment of the invention in which players compete against other players.

FIG. 5 illustrates a user interface 400 for facilitating play against other players using the gaming methods of the invention. User interface 400 comprises a bingo card in which players receive the same randomly generated grid 404b with tiles 406 which may include special or wager tiles. Players participate in rounds and compete against one another to create preset wining patterns, as in bingo, using grid 404b. Grid 404b may be purchased via credits or provided to players upon a triggering event, which may be time-based, such as every fifteen minutes, or an event occurring during play of grid 404a, which each player plays individually, such as achieving a certain credit amount or preset pattern. Play with grid 404b may be a race where players must achieve objectives to collect credits or to be one of the first to create a winning pattern. In some embodiments, one player or a group of players achieving a certain amount of objectives or creating the winning pattern within a certain time period may be deemed to have won the game represented by grid 404b. A leaderboard indicating the winners may be displayed to all players.

Figure 6:
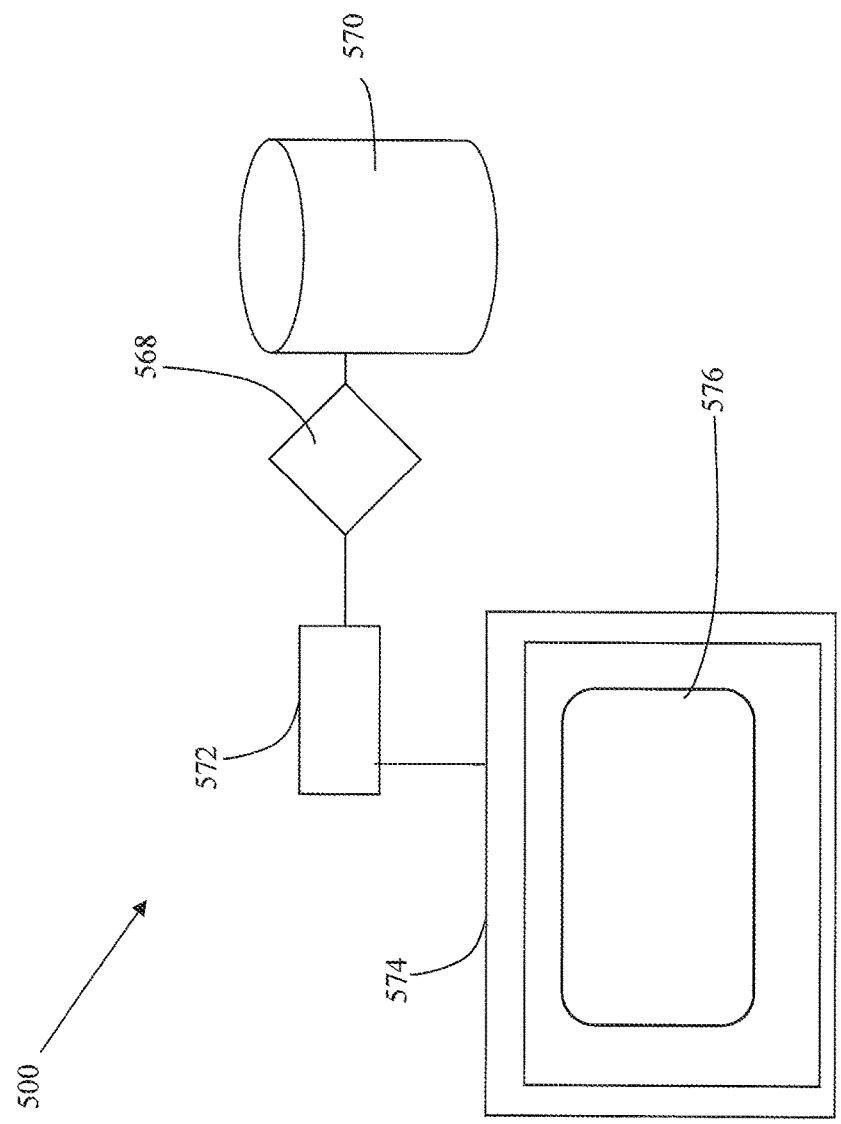
FIG. 6 is a schematic diagram depicting the components of an exemplary platform configured and constructed according to some embodiments of the invention.

FIG. 6 illustrates a diagram of an exemplary system 500, which may be a portable device, constructed in accordance with some embodiments of the invention. System 500 includes processing device 568 in communication with a database or memory device 570, communication or data input/output device 572 and a display device 574. In some embodiments, display device 574 is a touch-enabled device and includes a data input device component. Memory device 570 may include data relating to the underlying game and embodiments of the invention as described herein, such as the tiles, game play and wagering events. A player interface 576 can be presented on display device 574. Player interface 576 may be a virtual representation of an interface for facilitating game play in accordance with any of the embodiments herein. Game play and wagering event outcomes are displayed and tracked using display device 574 and processing device 568.

Figure 7:
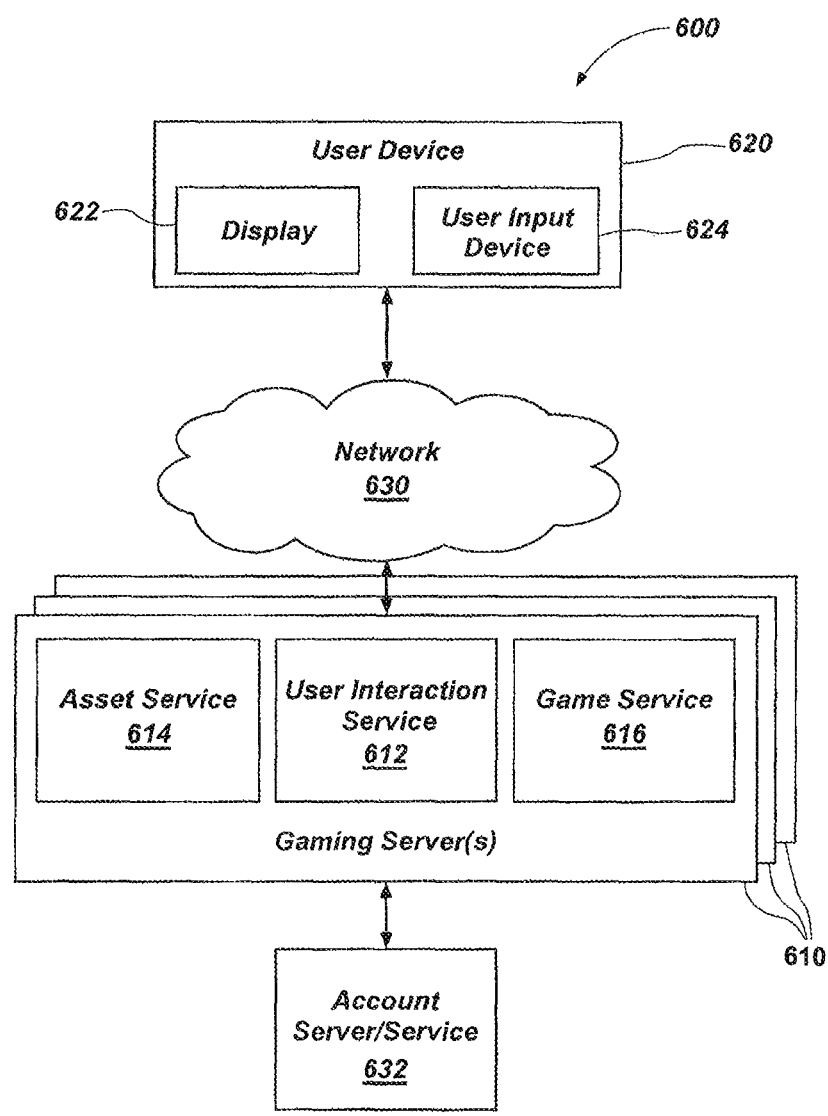
FIG. 7 is a schematic block diagram of another platform for implementing some embodiments of games of the invention.

In some embodiments, games in accordance with this disclosure may be administered using a gaming system employing a client-server architecture (e.g., over the Internet, a local area network, etc.). FIG. 7 is a schematic block diagram of an exemplary gaming system 600 for implementing games of the invention so that end users may remotely access games as described herein, among others.

The wagering games supported by the gaming system 600 may be operated with real currency or with virtual credits or other virtual (e.g., electronic) value indicia. For example, the real currency option may be used and currency cashed out at the end of a game session. The virtual credits option may be used with games of the invention in which credits may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This feature may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 600 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated.

The gaming system 600 may include a gaming platform to establish a portal for an end user to access a wagering game hosted by one or more gaming servers 610 over a network 630. In embodiments, games of the invention are accessed through a user interaction service 612. The gaming system 600 enables players to interact with a user device 620 through a user input device 624 and a display 622 and to communicate with one or more gaming servers 610 using a network 630 (e.g., the Internet). Typically the user device is remote from the gaming server 610 and the network is the word-wide web (i.e., internet).

In some embodiments, the gaming servers 610 may be configured as a single server to administer wagering games in combination with the user device 620. In other embodiments, the gaming servers 610 may be configured as separate servers for performing separate, dedicated functions associated with administering games of the invention. Accordingly, the following description also discusses "services" with the understanding that the various services may be performed by different servers or combinations of servers in different embodiments. As shown in FIG. 7, the gaming servers 610 may include a user interaction service 612, a game service 616, and an asset service 614. In some embodiments, one or more of the gaming servers 610 may communicate with an account server 632 performing an account service 632. As explained more fully below, for some games disclosed herein, the account service 632 may be separate and operated by a different entity than the gaming servers 610; however, in some embodiments the account service 632 may also be operated one or more of the gaming servers 610.

The user device 620 may communicate with the user interaction service 612 through the network 630. The user interaction service 612 may communicate with the game service 616 and provide game information to the user device 620. In some embodiments, the game service 616 may also include a game engine. The game engine may comprise game rules, such as those relating to the grid and/or tile generation and wagering events. In some embodiments, a single user device 620 communicates with a game provided by the game service 616, while other embodiments may include a plurality of user devices 620 configured to communicate and provide end users with access to the same game provided by the game service 616. In addition, a plurality of end users may be permitted to access a single user interaction service 612, or a plurality of user interaction services 612, to access the game service 616. The user interaction service 612 may enable a user to create and access a user account and interact with game service 616. The user interaction service 612 may enable users to initiate new games, join existing games, and interface with games being played by the user.

The user interaction service 612 may also provide a client for execution on the user device 620 for accessing the gaming servers 610. The client provided by the gaming servers 610 for execution on the user device 620 may be any of a variety of implementations depending on the user device 620 and method of communication with the gaming servers 610. In one embodiment, the user device 620 may connect to the gaming servers 610 using a web browser, and the client may execute within a browser window or frame of the web browser. In another embodiment, the client may be a stand-alone executable on the user device 620.

For example, the client may comprise a relatively small amount of script, also referred to as a "script driver," including scripting language that controls an interface of the client. The script driver may include simple function calls requesting information from the gaming servers 610. In other words, the script driver stored in the client may merely include calls to functions that are externally defined by, and executed by, the gaming servers 610. As a result, the client may be characterized as a "thin client." The client may simply send requests to the gaming servers 610 rather than performing logic itself. The client may receive player inputs, and the player inputs may be passed to the gaming servers 610 for processing and executing the wagering game. In some embodiments, this may involve providing specific graphical display information for the display 622 as well as game outcomes.

As another example, the client may comprise an executable file rather than a script. The client may do more local processing than does a script driver, such as calculating where to show what game symbols upon receiving a game outcome from the game service 616 through user interaction service 612. In some embodiments, portions of an asset service 614 may be loaded onto the client and may be used by the client in processing and updating graphical displays. Some form of data protection, such as end-to-end encryption, may be used when data is transported over the network 630. The network 630 may be any network, such as, for example, the Internet or a local area network.

The gaming servers 610 may include an asset service 614, which may host various media assets (e.g., text, audio, video, and image files) to send to the user device 620 for presenting the various wagering games to the end user. In other words, the assets presented to the end user may be stored separately from the user device 620. For example, the user device 620 requests the assets appropriate for the game played by the user; as another example, especially relating to thin clients, just those assets that are needed for a particular display event will be sent by the gaming servers 610, including as few as one asset. The user device 620 may call a function defined at the user interaction service 612 or asset service 614, which may determine which assets are to be delivered to the user device 620 as well as how the assets are to be presented by the user device 620 to the end user. Different assets may correspond to the various user devices 620 and their clients that may have access to the game service 616 and to different variations of wagering games.

The gaming servers 610 may include the game service 616, which may be programmed to administer wagering games and determine game play outcomes to provide to the user interaction service 612 for transmission to the user device 620. For example, the game service 616 may include game rules for one or more wagering games, such that the game service 616 controls some or all of the game flow for a selected wagering game as well as the determined game outcomes. The game service 616 may include pay tables and other game logic. The game service 616 may perform random number generation for determining random game elements of any game of the invention, such as game 102. In one embodiment, the game service 616 may be separated from the user interaction service 612 by a firewall or other method of preventing unauthorized access to the game service 612 by the general members of the network 630.

The user device 620 may present a gaming interface to the player and communicate the user interaction from the user input device 624 to the gaming servers 610. The user device 620 may be any electronic system capable of displaying gaming information, receiving user input, and communicating the user input to the gaming servers 610. For example, the user device 620 may be a desktop computer, a laptop, a tablet computer, a set-top box, a mobile device (e.g., a smartphone), a kiosk, a terminal, or another computing device. As a specific, non-limiting example, the user device 620 operating the client may be an interactive electronic gaming system 300 (see FIG. 4) or portable system 500 (see FIG. 6), as described above. The client may be a specialized application or may be executed within a generalized application capable of interpreting instructions from an interactive gaming system, such as a web browser.

The client may interface with an end user through a web page or an application that runs on a device including, but not limited to, a smartphone, a tablet, or a general computer, or the client may be any other computer program configurable to access the gaming servers 610. The client may be illustrated within a casino webpage (or other interface) indicating that the client is embedded into a webpage, which is supported by a web browser executing on the user device 620.

In some embodiments, components of the gaming system 600 may be operated by different entities. For example, the user device 620 may be operated by a third party, such as a casino or an individual, that links to the gaming servers 610, which may be operated, for example, by a wagering game service provider. Therefore, in some embodiments, the user device 620 and client may be operated by a different administrator than the operator of the game service 616. In other words, the user device 620 may be part of a third-party system that does not administer or otherwise control the gaming servers 610 or game service 616. In other embodiments, the user interaction service 612 and asset service 614 may be operated by a third-party system. For example, a gaming entity (e.g., a casino) may operate the user interaction service 612, user device 620, or combination thereof to provide its customers access to game content managed by a different entity that may control the game service 616, amongst other functionality. In still other embodiments, all functions may be operated by the same administrator. For example, a gaming entity may elect to perform each of these functions in-house, such as providing access to the user device 620, delivering the actual game content, and administering the gaming system 600.

The gaming servers 610 may communicate with one or more external account servers 632 (also referred to herein as an account service 632), optionally through another firewall. For example, the gaming servers 610 may not directly accept wagers or issue payouts. That is, the gaming servers 610 may facilitate online casino gaming but may not be part of a self-contained online casino itself. Another entity (e.g., a casino or any account holder or financial system of record) may operate and maintain its external account service 632 to accept wagers and make payout distributions. The gaming servers 610 may communicate with the account service 632 to verify the existence of funds for wagering and to instruct the account service 632 to execute debits and credits. As another example, the gaming servers 610 may directly accept wagers upon a wagering event occurring and make payout distributions, such as in the case where an administrator of the gaming servers 610 operates as a casino.

Additional features may be supported by the gaming servers 610, such as hacking and cheating detection, data storage and archival, metrics generation, messages generation, output formatting for different end user devices, as well as other features and operations.

Figure 8:
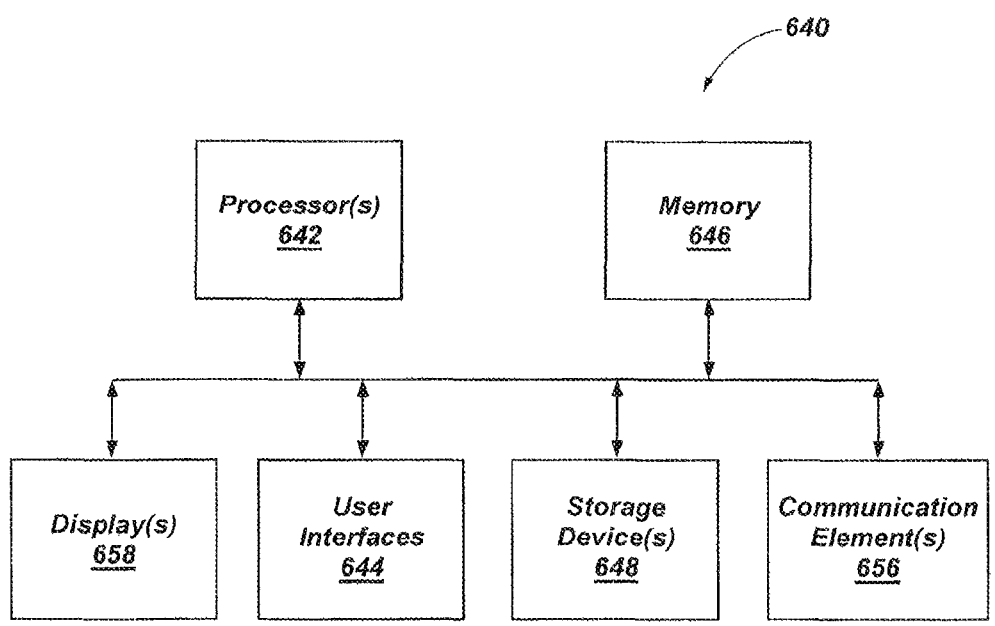
FIG. 8 is a block diagram of a computer for acting as a gaming system for implementing embodiments of wagering games in accordance with this disclosure.

FIG. 8 is a simplified block diagram showing elements of computing devices that may be used in systems and apparatuses of this disclosure. The computing system 640 may be a user-type computer, a file server, a computer server, a notebook computer, a tablet, a handheld device, a mobile device, or other similar computer system for executing software. The computing system 640 may be configured to execute software programs containing computing instructions and may include one or more processors 642, memory 646, one or more displays 658, one or more user interface elements 644, one or more communication elements 656, and one or more storage devices 648 (also referred to herein simply as storage 648).

The processors 642 may be configured to execute a wide variety of operating systems and applications including the computing instructions for administering wagering games of the present disclosure.

The memory 646 may be used to hold computing instructions, data, and other information for performing a wide variety of tasks including administering games of the invention, such as game 102. By way of example, and not limitation, the memory 646 may include Synchronous Random Access Memory (SRAM), Dynamic RAM (DRAM), Read-Only Memory (ROM), Flash memory, and the like.

The display 658 may be a wide variety of displays such as, for example, light emitting diode displays, liquid crystal displays, cathode ray tubes, and the like. In addition, the display 658 may be configured with a touch-screen feature for accepting user input as a user interface element 644.

As non-limiting examples, the user interface elements 644 may include elements such as displays, keyboards, push buttons, mice, joysticks, haptic devices, microphones, speakers, cameras, and touchscreens.

As non-limiting examples, the communication elements 656 may be configured for communicating with other devices or communication networks. As non-limiting examples, the communication elements 656 may include elements for communicating on wired and wireless communication media, such as for example, serial ports, parallel ports, Ethernet connections, universal serial bus (USB) connections, IEEE 1394 ("firewire") connections, Thunderbolt™ connections, Bluetooth® wireless networks, ZigBee wireless networks, 802.11 type wireless networks, cellular telephone/data networks, and other suitable communication interfaces and protocols.

The storage 648 may be used for storing relatively large amounts of nonvolatile information for use in the computing system 640 and may be configured as one or more storage devices. By way of example, and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 640 may be configured in many different ways with different types of interconnecting buses between the various elements. Moreover, the various elements may be subdivided physically, functionally, or a combination thereof. As one non-limiting example, the memory 646 may be divided into cache memory, graphics memory, and main memory. Each of these memories may communicate directly or indirectly with the one or more processors 642 on separate buses, partially-combined buses, or a common bus.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/ programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth in the claims and equivalents thereto.

The invention claimed is:

1. A system of providing a partially skill-based and partially chance-based wagering game in which the skill-based part increases the payout award in the chance-based part, the system comprising: a game server including a random number generator and a first memory device associated storing programming, a plurality of wagering event preset criteria and a plurality of executable instructions stored therein, an account server including a second memory device storing player account information including a credit balance, the game server being in communication with the account server, wherein responsive to the account server communicating receipt of a credit being deducted from a stored player account, executing the plurality of executable instructions to perform the steps of:

a) actuating the game server and the random number generator to randomly generate a user interface including a grid of variable tiles in a first configuration for display on the user interface, wherein each of the variable tiles is associated by the game server with a specific amount of credit that can be added to the stored player account through communication with the account server;
b) moving a tile in the grid of variable tiles responsive to receiving tile movement data through the user interface and comparing the tile movement data with one or more preset criteria for permitting tile movement; and
c) responsive to tile movement data satisfying any of the plurality of the wagering event preset criteria stored in the first memory device, the game server displaying the grid of variable tiles in a second configuration on the user interface and actuating a wagering event, wherein the wagering event includes the application by the game server of a randomly generated outcome, wherein a winning randomly generated outcome includes a payout award of credits that can be added to the stored player account through communication with the account server, and a skill-based outcome, the skill-based outcome being responsive to the tile movement data generated by moving one or more tiles into a predefined positional relationship stored in the first memory with respect to one or more other tiles, wherein the payout award of the randomly generated outcome is increased by the specific amount of credit associated with each tile of the one or more tiles having been moved into the predefined positional relationship, the randomly generated outcome being determined by the random number generator and the outcome thereof being displayed through the user interface by the game server, wherein the amount of credit of any payout award won is added by the account server to the player account stored in the second memory.

2. A system according to claim 1, wherein the variable tiles generated by the game server include a plurality of groups of tiles.

3. A system according to claim 2, wherein the wagering event preset criteria stored in the first memory comprises a tile from a specific first group being moved adjacent to one or more tiles from a specific second group, the second group being different from the first group.

4. A system according to claim 2, wherein the wagering event preset criteria stored in the first memory comprises a tile from a specific first group being moved adjacent to one or more tiles from the same group.

5. A system according to claim 1, wherein the randomly generated outcome determined by the random number generator is displayed by animating the grid such that the columns of the grid resemble spinning slot machine reels.

6. A method of directing a gaming system including an account server and a game server, the game server having a processor configured to execute game software stored in a memory in connection with the a random number generator responsive to the detection of a currency wager received through a user interface provided by the account server in communication with the game server, the currency wager being deducted from a player account stored in memory responsive the player being in communication with the account server through the user interface, the game software providing a partially skill-based and partially chance-based wagering game for interactive play in which the account server handles the player account, wagering and award payout independently of operation of the game software by the game server which is configured to determine a game outcome in which the skill-based part increases the payout award in the chance-based part, the method comprising:
the game server simultaneously operating and using the random number generator to randomly generate for display on a display device a single video playfield interface comprising a grid of variable tiles, wherein the grid of variable tiles is enabled to be interactively manipulated through contact with the display device to provide a matching three or more tiles game and a slot machine game; and
enabling a player to actuate the game server to display on the display device the variable tiles as spinning tiles responsive to at least three of the variable tiles being moved into a matched relationship with each other by manipulating the tiles through contact with the display device, wherein the spinning tiles is actuated in the same position of the tiles forming the matched relationship, wherein each of the tiles is associated by the game server with a specific amount of credit;
determining a game outcome based on a randomly generated outcome and a skill-based outcome, wherein the randomly generated outcome includes using the random number generator in generating a random outcome of the spinning tiles and displaying the random outcome of the spinning tiles, wherein the game outcome is based at least partially on the randomly determined outcome of the currency wager made on the spinning tiles and partially on the amount of credit associated with each of the tiles forming the matched relationship of tiles in the matching three or more tiles game; and
the account server crediting to the player account a payout award based on the game outcome.

7. A partially chance-based and partially skill-based wagering game method in which the skill-based part increases the payout award in the chance-based part provided over a communication network, comprising the steps of:
providing a game server, an account server and a user interaction server;
providing, by the user interaction server, a client for execution on a user device connected to the network and associated with a player, the user device being remote from the game server;
the client receiving from the user device and communicating to the account server, an indication of a wager being entered by the player to participate in the wagering game, the wager being in the form of credits deducted from a player account stored in memory;
the account server verifying the wager based on a credit balance stored in memory in connection with the player account;
the game server randomly determining a first set of tiles in a grid formation defining an initial configuration of the grid, wherein each tile is associated with an amount of credit;
the game server communicating to the user interaction server the initial configuration;
the user interaction server communicating to the user device the initial configuration for display on the user device;
the game server receiving from the client a request for a change of the initial configuration from the user device;
the game server comparing the request with a wagering event preset criteria for changing the initial configuration;
the game server communicating to the user interaction server the actuation of a wagering event responsive to the request satisfying the wagering event preset criteria;
the user interaction server communicating to the user device the actuation of a wagering event for display on the user device;

the game server resolving the wagering event by a randomly generated outcome and a skill-based outcome, the randomly generated outcome being determined by the random number generator and the outcome thereof being displayed through the user interface, wherein a winning outcome is a payout award of credits, and the skill-based outcome determined by the moving of tiles into a predefined positional relationship with respect to one another, wherein the payout award of the randomly generated outcome is increased by the amount of credit associated with each tile of the tiles moved into the predefined positional relationship; and the account server adding to the player account an amount of credit equal to any payout award.

* * * * *